United States Patent
Dishcler

[11] 3,769,905
[45] Nov. 6, 1973

[54] SCREW PRESS
[75] Inventor: Helmut Dishcler, Neub-Udesheim, Germany
[73] Assignee: Novopress GmbH Pressen und Preswerkzeuge & Co. KG, Dusseldorf, Germany
[22] Filed: Feb. 23, 1972
[21] Appl. No.: 228,568

[30] Foreign Application Priority Data
Mar. 3, 1971 Germany.................. P 21 10 044.7

[52] U.S. Cl.......... 100/289, 192/103 A, 192/105 B, 192/105 C, 192/105 CD
[51] Int. Cl............................................. B30b 1/22
[58] Field of Search................ 100/289; 192/103 A, 192/105 C, 105 B, 105 CD

[56] References Cited
UNITED STATES PATENTS
1,670,438  5/1928  Coleman...................... 192/105 C
2,002,699  5/1935  Larsen......................... 192/103 A FOREIGN PATENTS OR APPLICATIONS
41,046     5/1965   Germany..................... 100/289
1,009,400  11/1965  Great Britain................ 100/289
1,133,530  11/1968  Great Britain................ 100/289
1,168,253  4/1964   Germany..................... 100/289

Primary Examiner—Harvey C. Hornsby
Assistant Examiner—Philip R. Coe
Attorney—Berman, Davidson & Berman

[57] ABSTRACT

The invention relates to a screw press of the kind which incorporates a screw, in the machine or press frame, operated by a fly wheel continuously rotating in one direction, the fly wheel and screw having a releasable coupling connecting them the coupling being released on the attainment of a predetermined pressing effect. The invention is particularly concerned with the release of the coupling and provides a press wherein the release of the coupling is effected to remove as much energy as possible from the fly wheel before the uncoupling is effected the construction being such that the release takes place on the falling below of a predetermined angular velocity and/or the exceeding of predetermined angular retardation of the screw.

12 Claims, 7 Drawing Figures

SCREW PRESS

BACKGROUND OF THE INVENTION

The invention relates to a screw press of the kind having a screw incorporated in the machine or press frame with a fly wheel continuously rotating in one direction of rotation, and a releasable coupling located between the fly wheel and the screw, which coupling is released after a predetermined pressing effect is reached.

In such screw presses the energy required for shaping work is for the most part derived from the fly wheel and to a small extent by the kinetic energy of the rotating screw and the parts connected with it. In all shaping work which can be carried out with the screw press care must accordingly be taken that the machine frame asorbing the force between the upper die and the lower die is not overloaded. Liniting cases for shaping work which come into consideration are on the one hand a severe rebound shock and on the other hand the shaping of a soft workpiece over a long path.

An object of the present invention is so to construct a screw press of the aforementioned kind, that by means of the coupling the connection between the fly wheel and the screw in the shaping operation is released so late that as much energy as possible can be removed from the fly wheel, without on the other hand the risk arising that for example in a severe rebound shock the machine frame is overloaded.

SUMMARY OF THE INVENTION

The invention provides a screw press with a screw incorporated in the machine or press frame, a fly wheel continuously rotating in one direction of rotation, a releasable coupling located between the fly wheel and the screw, and means for releasing the coupling with the falling below of a predetermined angular velocity and/or with the exceeding of a predetermined angular retardation of the screw.

In such a screw press in accordance with the invention an overloading of the machine frame is excluded, since such an overloading will always be preceded by a lowering of the angular velocity. This lowering of the angular velocity of the screw is however, according to the invention, used to release the coupling between the screw and the fly wheel. Since, on the other hand, the angular velocity of the screw during a normal shaping process does not substantially decrease it cannot give rise to a premature release of the coupling.

The coupling can, for example, be constructed as a centrifugal clutch. Preferably the coupling has a part rigidly connected with the fly wheel and a part frictionally co-operating with that part and movable in relation to it, which is non-rotatably connected with the screw. The correlation of the movable coupling part to the screw facilitates the actuation of the coupling depending on the angular velocity or angular retardation of the screw.

In the use of a purely mechanical coupling it is provided that the coupling has for actuation centrifugal weights, which relative to the screw axis are movable in substantially radial and/or tangential direction. In the radial direction the centrifugal force acts on the centrifugal weights, which force depends on the angular velocity of the screw. In contrast in the tangential direction there acts on the centrifugal weights a moment of inertia dependent on the angular retardation of the screw. Both movements engendered by these two forces can, according to the invention, be brought into use for actuation of the coupling.

In order to avoid that through the centrifugal weights connected with the screw the total moment of inertia and therewith the kinetic energy still retained in the screw after the uncoupling is too large, it is provided according to a further feature of the invention, that the centrifugal weights of the centrifugal coupling are arranged close to the screw axis and are connected through a force strengthening lever arrangement with the movable part of the coupling. As low as possible a kinetic energy of the screw after the uncoupling is to be aimed at in so far as then with uniform total loading on the machine frame more energy can be taken from the fly wheel.

Another possibility lies in that the centrifugal weights are constructed as balls, and are arranged in a wedge-shaped gap converging relative to the screw axis in the radial direction between the movable coupling part and an abutment. In this case also there arises a strengthening of the centrifugal force for actuation of the coupling, so that the balls can be arranged in the neighbourhood of the screw axis.

Another embodiment of the screw press according to the invention is characterised in that the coupling is actuated by pressure means. Accordingly the possible disadvantage with centrifugal force coupling is avoided in that the contact pressure on the coupling in the coupled state is dependent on the angular velocity of the coupling. Preferably it is accordingly provided that a pressure chamber which can be charged with pressure fluid is associated with the coupling, which is closed on this charging, the pressure chamber having an outlet valve which opens on falling below a predetermined angular velocity and/or on exceeding a predeterminded angular retardation. In this way it is attained that the coupling in the coupled condition has independently of its angular velocity a constant contact pressure. Nevertheless the coupling is actuated in the manner according to the invention.

In the last mentioned embodiment of a screw press according to the invention the outlet valve can be actuatable by a centrifugal weight which is movable relative to the screw in the radial and/or tangential direction. It is however also possible that the outlet valve can be actuated through a measuring device for angular velocity and/or angular retardation of the screw, for example, in an electrical manner.

A specially preferred embodiment of the screw press with a purely mechanical coupling is characterised in that the centrifugal weights and the movable part of the coupling are arranged together on levers which are swingable about an axis of rotation parallel to the screw axis. In this way one can manage with a minimum number of movable elements and the wearing out of exposed joints. Nevertheless the aforementioned movability of the centrifugal weights in the radial or tangential direction relative to the screw axis is possible.

When the centrifugal weights are to be movable not only through the centrifugal force but also through the moment of inertia appearing on angular retardation of the screw, each centrifugal weight in a coupled up couplng is preferably so arranged that a straight line passing through the centrifugal weight and running tangentially relative to the screw axis does not cut the axis of rotation parallel to the screw axis. Preferably the contruction is such, that the tangentially running line cuts the plane between the screw axis and the axis of rotation, at a point which is at a greater distance from the screw axis than the axis of rotation, whereby the centrifugal weight precedes the axis of rotation in the direction of rotation. In this way the centrifugal force and the tangential mass inertia force act in such a way on the centrifugal weight, that relative to the axis of rotation two opposedly directed turning moments are developed, of which one increases with the angular velocity and the other with the angular retardation of the screw. The sum of these two turning moments can accordingly be directly drawn in for actuation of the coupling.

The foregoing described embodiments of the invention can also be so constructed that the slippage between the two coupling parts in the coupled condition serves as measure for the angular retardation one coupling part being connected with the screw and the other with the fly wheel. Such a screw press according to the invention is characterised preferably through a feeler for the relative movement of the two parts of the coupling in the coupled condition or an additional auxiliary coupling arranged parallel or in series, of which one part is connected with the screw and the other with the fly wheel, wherein the feeler is connected with a release device for uncoupling the coupling and/or the auxiliary coupling. A high operational safety of the screw press according to the invention is especially attained with the use of an auxiliary coupling, since with the appropriate lay-out of the coupling and auxiliary coupling a slippage in the coupling always occurs first before an overloading of the machine frame.

For return of the upper die connected with the screw after the shaping process and/or for the coupling of the screw on the fly wheel, it is provided according to a further feature of the invention that the upper die connected with the screw is movable in both directions parallel to the screw axis through an exterior driving device. The coupling of the screw with the fly wheel then results in the use of a centrifugal coupling in a simple way in that the upper die is displaced a short distance in the working direction through the driving device. Accordingly the screw is given an angular velocity which suffices to couple in the centrifugal clutch.

Embodiments of the invention are described below with reference to the drawing.

DESCRIPTION OF THE PREFERRED EMBODIMENTS

Figure 1:
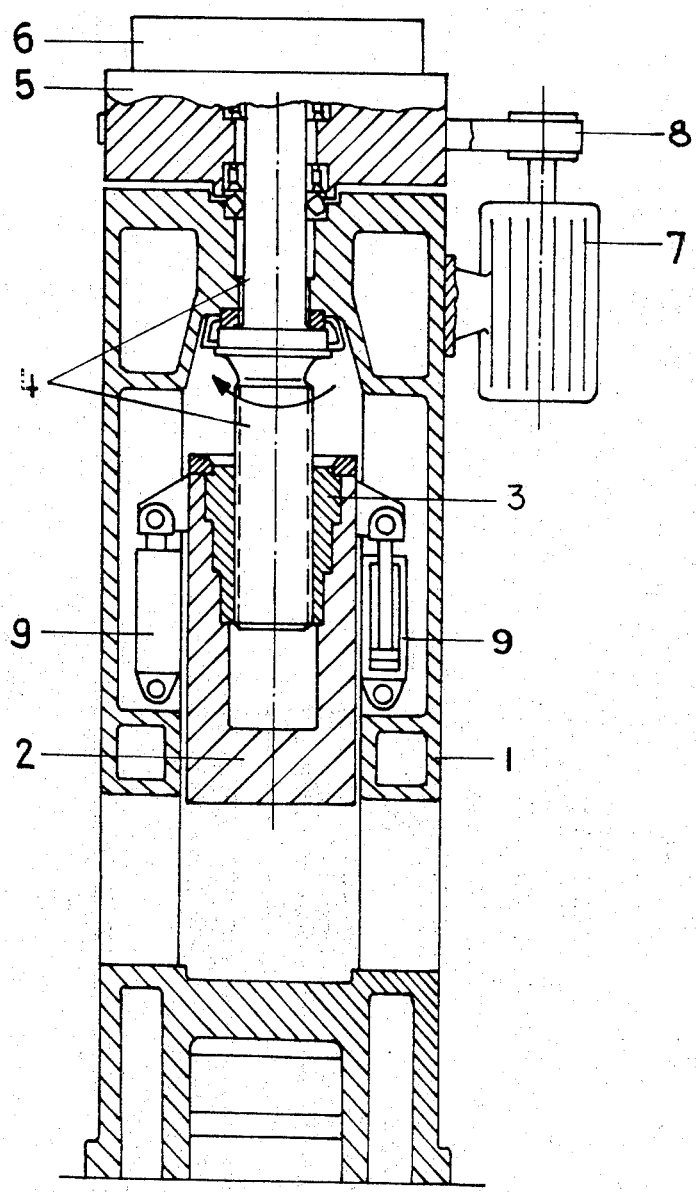
FIG. 1 is a general view of a screw press according to the invention partially in section.

The screw press illustrated in FIG. 1 has a machine fram 1 in which an upper die 2 is guided for up and down movement. The upper die 2 is supported on a screw 4 by spindle nut 3, the rotation of the screw in the direction of the arrow moving the spindle nut 3 and with it the upper die 2 in a downward direction. Hydraulic cylinders 9 are provided for upward movement of the upper die 2.

At the head of the screw press a fly wheel 5 is rotatably mounted about the same axis as the screw 4. The fly wheel 5 can be rotated by a motor 7 through a belt drive 8.

A coupling device is indicated by reference numeral 6 in FIG. 1 by which device, for carrying out a pressing operation, the screw 4 can be coupled with the rotating fly wheel 5 and, after a certain pressing effect has been attained, the fly wheel can again be uncoupled. The invention is concerned primarily with the last mentioned procedure. In the following described embodiments of coupling devices 6, for simplicity only those parts are diagrammatically illustrated and described which serve for uncoupling of the screw 4 from the rotating fly wheel 5 after attainment of a certain pressing effect. For coupling of the screw 4 with the fly wheel 5 certain additional devices are of course requisite. It suffices for example if the hydraulic cylinders 9 are double-acting. Through a short downward movement of the upper die 2 the screw can be rotated so far that the coupling device serving for the uncoupling is coupled in.

Figure 2:
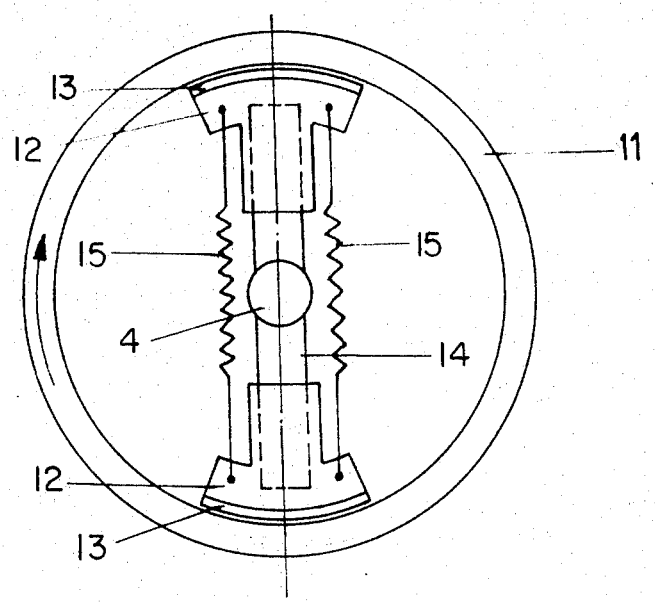
FIGS. 2 to 7 show different embodiments of coupling devices for the screw press according to the invention.

In the embodiment according to FIG. 2 a coupling drum is indicated by reference numeral 11, this drum being rigidly connected with the fly wheel 5, (not shown). The direction of rotation of fly wheel 5 and coupling drum 11 is indicated by an arrow. The screw 4 projects into the interior of the coupling drum 11 and there supports a centrifugal weight carrier 14 extending radially on two sides. On the centrifugal weight carrier 14 there are mounted two like centrifugal weights 12 displaceable in radial direction and lying radially oppostie one to another. The centrifugal weights 12 are on the sides adjacent to the inner wall of the coupling drum 11 adapted to the shape of the latter and there carry friction linings 13. A recoil force directed towards the screw 4 is exerted on the centrifugal weights 12 by means of springs 15.

The coupling illustrated in FIG. 2 uncouples the screw 4 from the fly wheel 5 when the angular velocity of the screw 4 falls below a certain minimum value. It is thus a question of a purely centrifugal clutch.

The coupling illustrated in FIG. 2 has the disadvantage that after the uncoupling a relatively large working load remains conected with the screw 4. This working load is formed through the centrifugal weights 12, which in the radial direction are relatively widely spaced from the axis of the screw. The kinetic energy retained in this working load after the uncoupling must be taken into account in the laying out of the machine frame 1 insofar as no damage to the machine frame should arise in the striking of the upper die on a nondeformable object. The machine frames 1 must thus be over dimensioned. Otherwise only a reduced quantity of energy can be drawn from the fly wheel and only a reduced pressing force attained.

Figure 3:
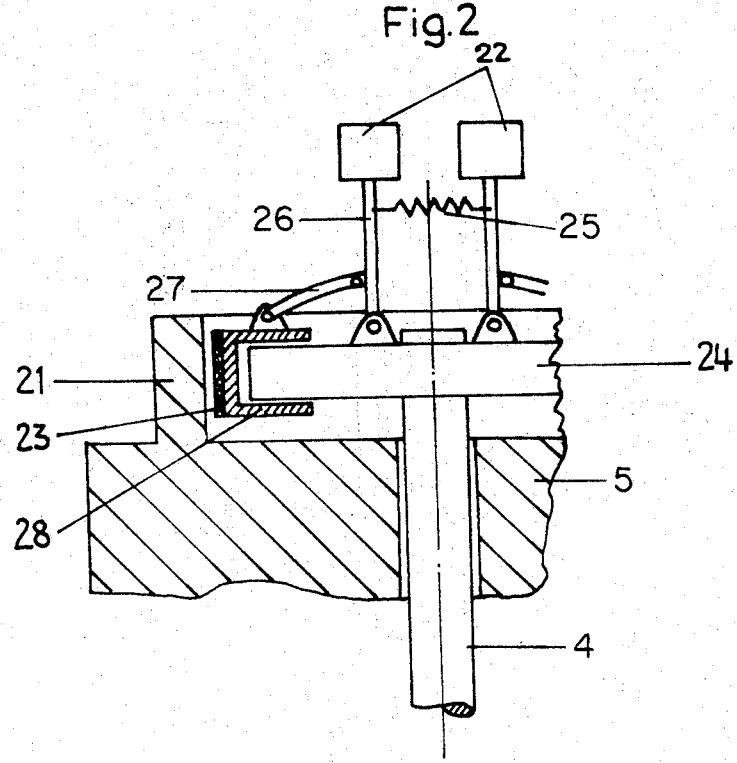

FIG. 3 shows an embodiment of the coupling device 6, in which the disadvantage of a large working load connected with the screw 4 is avoided. On the centrifugal weight carrier here indicated by reference numeral 24, two levers 26 are mounted for rotation in the radial direction. The levers 26 each carry at their free ends a centrifugal weight 22. The centrifugal weight 22 are located in the immediate neighbourhood of the axis of the screw. Accordingly the moment of inertia of the working load formed from them is small. Nevertheless a sufficient contact pressure for the coupling part 28 radially movably on the centrifugal weight carrier 24 is attained. Each centrifugal weight 22 thus acts through a long lever arm on a connecting rod 27 which is connected with a movable coupling part 28. Each movable coupling part 28 carries, as in the embodiment according to FIG. 2, a friction lining 23 which co-operates with the inner wall of a coupling drum 21. A spring 25 is provided as return device for the centrifugal weights 22.

Figure 4:
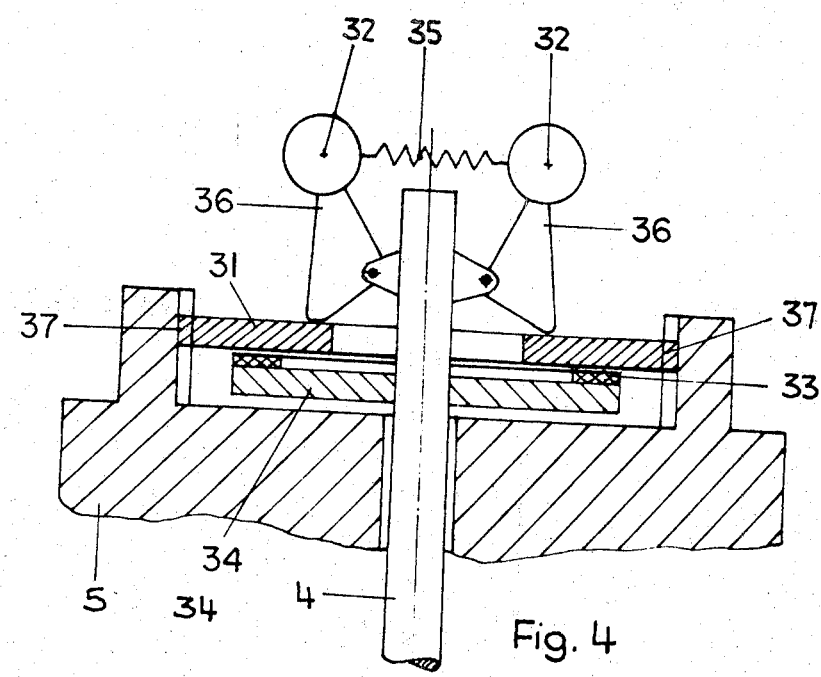
Figure 5:
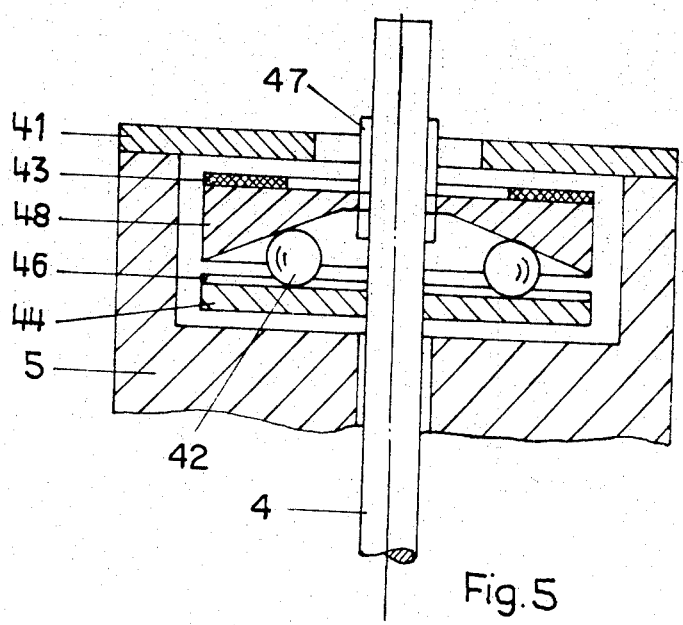

Further embodiments of centrifugal couplings for the screw press according to the invention are illustrated in FIGS. 4 and 5.

In FIG. 4 the centrifugal weights are indicated by reference numeral 32. They are fastened to cam levers 36, which for their part are secured for rotation in the radial direction on the screw 4. A spring 35 is provided as the return device for the centrifugal weights 32. The cam levers 36 act with their cams on a coupling disc 31, which is displaceable in the axial direction but is guided non-rotatably in a slotted guide 37 on the fly wheel 5. The counter-piece of the coupling is formed by a plate 34 fixedly connected with the screw 4, which plate carries a friction lining 33 co-operating with the coupling disc 31. As in the embodiment according to FIG. 3 here also a high contact pressure is attained with a small moment of inertia of the centrifugal weight arrangement, since the cam lever 36 is so constructed that the centrifugal weights 32 are removed further from their point of rotation then the cams acting on the coupling disc 31 and accordingly a strengthening force arises through lever action.

In FIG. 5 balls 42 are provided as centrifugal weights which are supported on a carrier plate 44 fixedly connected with the screw 4 and are there guided in radially running grooves 46. A plate 48 of V-formation is non-rotatable on the screw 4 but is displaceably mounted axially in a slotted guid 47. The V-shaped plate 48 lies with its surfaces formed as inclined planes on the balls 42 and carries on its upper surfaces a friction lining 43. The friction lining 43 co-operates with a coupling disc 41 fixedly connected with the fly wheel 5. So long as the balls 42 give a sufficiently high centrifugal force in the radial direction the V-shaped plate 48 remains so far uplifted that the coupling is closed. Similarly as in the embodiment according to FIGS. 3 and 4 there also occurs here a strengthening of force through lever action, which is conditioned through a suitable angle of the inclined plane of the V-shaped plate 48.

Figure 6:
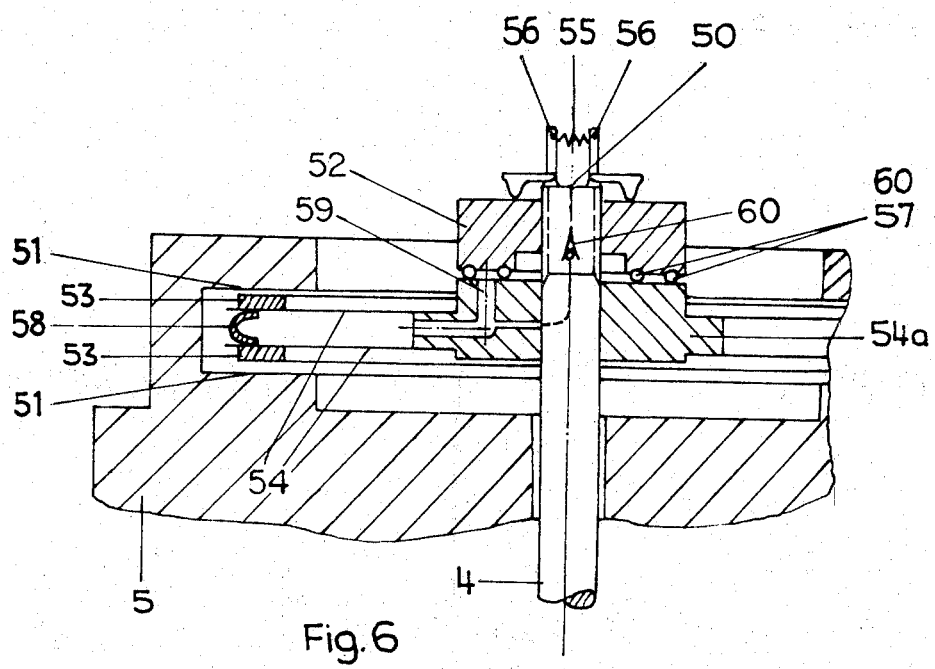

FIG. 6 shows an embodiment of a coupling device for a screw press according to the invention in which in contrast to the earlier described centrifugal force couplings the contact pressure is independent of the angular velocity and which in addition uncouples on exceeding a certain angular retardation. In this embodiment of the invention two spring plates 54 are fastened, spaced apart in the axial direction, non-rotatably immovably and in air tight manner by a boss 54a to the screw 4. The two spring plates 54 are connected at their periphery through an air tight rubber pad 58 so that an air tight space exists between them. The spring plates 54 carry friction linings 53 which on flexing of the spring plates 54 are pressed against the corresponding counter surfaces 51 of the fly wheel 5, when the space between the spring plates 54 is charged with compressed air. The coupling is then coupled in. For introduction of the compressed air there is an inlet 50 incorporating a non-return valve 60 so that the introduced air cannot escape therefrom. In the hub 54a is an outlet 59 for the air between the two spring plates 54. The outlet 59 is normally sealed in that a nut 52 formed as a working load and having two annular packings 57 lies on the hub 54a, wherein the outlet 59 opens out into the space between the two packings 57. The nut 52 is screwed onto an outer thread of the screw 4. This thread has such a pitch that neither in the case of forces exerted in the axial direction nor in the tangential direction on the nut 54 an automatic restraint occurs. The nut 52 is normally pressed against the hub 54a by pressure spring 55 through a toggle lever 56, but can however be raised from the hub 54a by rotation relative to the screw 4 in the direction of rotation of the fly wheel 5. The force of the pressure spring 55 is so regulated that the nut 52 cannot be lifted from the hub 54a through the pressure between the spring plates 54 and accordingly the air cannot leak away. A lifting up however takes place when the angular retardation of the screw 4 exceeds a certain value, since then the nut 52 formed as a working load rotates relatively to the screw 4. The air then escapes through the outlet 59 and the screw 4 is uncoupled from the fly wheel 5. The uncoupling can additionally be made dependent on the angular velocity. In this case the angular lever 56 need only be provided with centrifugal weights, where the pressure sping 55 contacts. Likewise it is possible to make the uncoupling exclusively dependent on the angular velocity, if in place of the thread between the nut 52 and screw 4 slide guide is provided in the axial direction. The contact pressure of the coupling according to FIG. 6 is only dependent on the air pressure in the space between the two spring plates 54, but not however on the angular velocity of the screw 4.

The uncoupling can also take place through an electrically actuated outlet valve. In this case an electrical measuring device is provided for the angular velocity and/or the angular retardation of the screw, which on the falling below of a certain minimum angular velocity and/or on the exceeding of a certain angular retardation gives a signal to the actuating device for the outlet valve.

Figure 7:
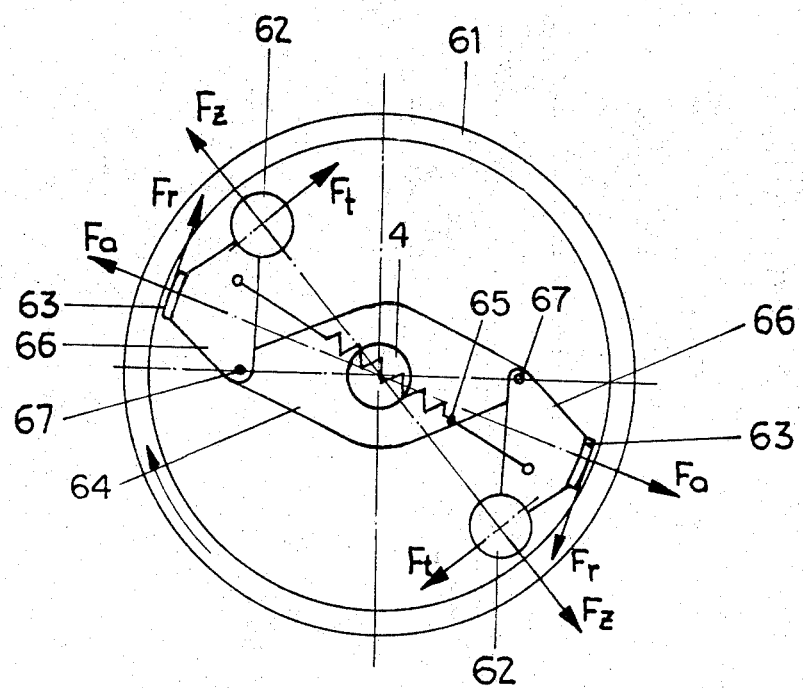

In FIG. 7 there is illustrated an embodiment of the coupling device 6 for screw press according to the invention in which the uncoupling of the screw 4 from the fly wheel 5 is dependent on the angular velocity and on the angular retardation of the screw 4. The fly wheel 5, not illustrated in detail in FIG. 7, is fixedly connected with a coupling drum 61. The screw 4 supports a carrier plate 64 on the free ends of which are arranged two centrifugal weight carriers 66 rotatable about perpendicualr rotating axis 67. The centrifugal weight carriers 66 each carry at their free ends a centrifugal weight 62. Furthermore the centrifugal weight carriers 66 each have a friction lining 63 which co-operates with the inner wall of the coupling drum 61. By means of a recoil spring 65 the centrifugal weight carriers 66 are tensioned in the direction of the screw 4. The direction of rotation of the coupling is indicated by an arrow.

On the one hand a centrifugal force Fz acts in the radial direction on the centrifugal weights 62 and increases with the angular velocity of the screw 4. Accordingly there is exerted on the centrifugal weight carriers 66 a turning moment about the pivotal axis 67, through which the friction lining 63 is pressed with a force Fa against the coupling drum 61. If the rotational movement of the spindle 4 is retarded then there acts additionally on the centrifugal weights 62 a tangential force Ft increasing with the angular retardation, which relatve to the pivotal axis 67 exerts a turning moment on the centrifugal weight carrier 66, which is directed oppositely to the turning moment exerted through the centrifugal force. Accordingly there is exerted on the friction lining 63 a force oppositely directed to the contact pressure Fa. Uncoupling of the coupling device according to FIG. 7 takes place if the pressure force Fa is offset by the sum of the aforementioned opposedly directed force and the force of the recoil spring 65. This is the case when the angular velocity of the screw 4 has fallen below a certain minimum value and/or when the angular retardation of the screw 4 has exceeded a certain value.

In the embodiment according to FIG. 7 the uncoupling is also assisted in that through the frictional force Fr exerted on the frictional lining 63 a further turning moment is exerted on the centrifugal weight carriers 66 relative to the pivotal axis 67, through which results a further force oppositely directed to the contact pressure Fa. This property known in drum brakes as negative servo-action has the advantage that alterations of the coefficient of friction of the friction lining occur subproportional to the friction force Fr and therefore cause hardly an disturbance. The release point of the coupling can accordingly be regulated very exactly.

In a practical embodiment of the screw press according to the invention with a coupling device according to FIG. 7 it has been shown that the time during which the coupling slips in uncoupling amounts only to about three milliseconds. Accordingly the friction lining 63 can have a relatively small friction surface without rapid wear having to be feared.

The coupling devices according to FIGS. 2 to 5 can also be so constructed that an uncoupling takes place not only in falling below a certain minimum angular velocity but also on exceeding a determined maximum angular retardation. For this it is only necessary that with the centrifugal weights 12, 22, 32, or 42 the direction of the path through which they can be displaced or pivoted is altered. In the embodiments illustrated in FIGS. 2 to 5 this path extends relative to the screw 4 essentially in the radial direction, that is to say, its extension cuts through the screw axis. Accordingly the centrifugal weights 12, 23, 32 and 42 can be displaced only through the centrifugal force. If in contrast the direction of the path about which the centrifugal weights can be displaced or pivoted is so chosen that the extension of this path does not cut through the axis of the screw 4, then the centrifugal weights 12, 22, 32 or 42 are displaced on the occurrence of an angular acceleration or angular retardation. This gives two possibilities; on the occurrence of an angular retardation the coupling is actuated in either the coupling or uncoupling sense. The latter possibility comes into consideraton for the subject matter of the invention. If the centrifugal weights 12, 22, 32 or 42 are movable relative to the screw exclusively in the tangential direction, then the uncoupling results independently of the centrifugal force and accordingly of the angular velocity of the screw 4. In this case the screw 4 is uncoupled only on exceeding a certain angular retardation at any angular velocity of the fly wheel 5.

I claim:

1. A screw press comprising a screw incorporated in a machine frame and actuating a movable upper die of the screw press, a flywheel, driving means for continously rotating said flywheel in one direction of rotation, a releasable clutch having a driving member connected to the flywheel and a driven member connected to the screw, said dirven member being movable relatively to said driving member so as to engage or to disengage said members, said driving and driven members being in yieldable frictional driving engagement during the working stroke of the screw press, and release means for said clutch incorporating inertia masses for actuating said release means to disengage said driving and driven members dependent on decreasing of speed of the driven member and the screw connected thereto after a predetermined pressing effect of the screw press is attained. Pivotal axis at a point which has a greater distance from the screw axis than from the pivotal axis, whereby the centrifugal weight precedes the pivotal axis in the direction of rotation.

2. A screw press according to claim 1, wherein said releasable clutch is constructed as a centrifugal clutch, said inertia masses being rotatably associated with said screw.

3. A screw press according to claim 2, wherein said inertia masses comprise centrifugal weights which are movable relatively to the axis of rotation of said screw substantially in the radial direction.

4. A screw press according to claim 3, wherein said centrifugal weights are located near the axis of rotation of said screw, and said release means for said clutch further comprises a force strengthening lever arrangement connected to the centrifugal weights for increasing the frictional engagement between driving and driven members of the clutch.

5. A screw press according to claim 3, characterised in that the centrifugal weights are constructed as balls located in a wedge-shaped gap converging relatively to the screw axis in the radial direction between the movable coupling part and an abutment.

6. A screw press according to calim 2, wherein said inertia masses are centrifugal weights and said weights and said driven member of the releasable clutch are mutually arranged on levers which are pivotal about a pivotal axis parallel to the screw axis.

7. A screw press according to claim 6, characterised in that each centrifugal weight is so arranged, with the clutch in engagement, that a straight line passing through the centrifugal weight and running tangentially relative to the screw axis, does not cut the pivotal axis parallel to the screw axis.

8. A screw press according to claim 7, characterised in that said line running tangentially cuts the plane extending between screw axis and the 9. A screw press according to claim 1, wherein said upper die is provided with external driving devices for actuation in both directions parallel to the screw.

10. A screw press according to claim 1, characterised in that said releasable clutch is actuated by pressure means.

11. A screw press according to claim 1, characterised in that said releasable clutch incorporates a pressure chamber which can be charged with pressure fluid, by which charging the clutch is closed, said pressure chamber having an outlet valve which opens on the falling below of a predetermined angular velocity of the screw.

12. A screw press according to claim 11, characterised in that the outlet valve is actuated by means of a centrifugal weight, which is movalbe relative to the screw in radial and, tangential direction.

* * * * *

UNITED STATES PATENT OFFICE
CERTIFICATE OF CORRECTION

Patent No. 3,769,905                    Dated  Nov. 6, 1973

Inventor(s)   HELMUT DISCHLER

It is certified that error appears in the above-identified patent and that said Letters Patent are hereby corrected as shown below:

[75]  change spelling of inventor's last name to --DISCHLER--

[73]  change "Preswerkzeuge" to -- Presswerkzeuge--

Column 1, line 17, correct spelling of "absorbing"

Column 3, line 59, correct spelling of "frame"

Column 4, line 61, change "weight" (second occurrence)to--weights

Column 5, line 34, correct spelling of "guide"

Column 6, line 27, insert "a" after "screw 4"

Column 6, line 68, correct spelling of "relative"

Column 7, line 23, change "an" to --any--

Column 8, line 12, delete "Pivotal axis at a point which has a greater"

Column 8, lines 13-15, delete in their entirety

Column 8, line 49, insert at end of line the following--pivotal axis at a point which has a greater distance from the screw axis than from the pivotal axis, whereby the centrifugal weight precedes the pivotal axis in the direction of rotation.--

Column 8, line 2, correct the spelling of "driven"

Column 8, line 65, correct spelling of "movable"

Column 8, line 66, delete the comma (,).

Signed and sealed this 2nd day of July 1974.

(SEAL)
Attest

EDWARD M. FLETCHER, JR.          C. MARSHALL DANN
Attesting Officer                Commissioner of Patents